(12) United States Patent  
Park et al.

(10) Patent No.: US 11,300,777 B2
(45) Date of Patent: Apr. 12, 2022

(54) ROTATIONAL VARIFOCAL PLANAR LENS

(71) Applicant: SAMSUNG ELECTRONICS CO., LTD., Suwon-si (KR)

(72) Inventors: Junghyun Park, Seoul (KR); Sunghyun Nam, Yongin-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 120 days.

(21) Appl. No.: 16/904,149

(22) Filed: Jun. 17, 2020

(65) Prior Publication Data

US 2020/0319438 A1 Oct. 8, 2020

Related U.S. Application Data

(63) Continuation of application No. 16/291,552, filed on Mar. 4, 2019, now Pat. No. 10,725,273, which is a (Continued)

(30) Foreign Application Priority Data

Oct. 4, 2016 (KR) .................. 10-2016-0127546

(51) Int. Cl.
  *G02B 15/20* (2006.01)
  *G02B 1/00* (2006.01)
  (Continued)

(52) U.S. Cl.
  CPC .............. *G02B 26/08* (2013.01); *G02B 1/002* (2013.01); *G02B 3/0037* (2013.01); (Continued)

(58) Field of Classification Search
  CPC ...... G02B 15/20; G02B 1/002; G02B 3/0068; G02B 5/1809; G02B 3/0037; G02B 15/24;
  (Continued)

(56) References Cited

U.S. PATENT DOCUMENTS 3,305,294 A 2/1967 Alvarez
3,507,565 A 4/1970 Alvarez et al.
  (Continued)

FOREIGN PATENT DOCUMENTS

CN  1664641 A  9/2005
CN  103988109 A  8/2014
JP  4383005 B2  12/2009

OTHER PUBLICATIONS

Amir Arbabi et al., "An optical metasurface planar camera", arXiv:1604.06160v1, Physics.Optics, Apr. 21, 2016, pp. 1-29 (Twenty-nine (29) pages total).
  (Continued)

*Primary Examiner* — Jack Dinh
(74) *Attorney, Agent, or Firm* — Sughrue Mion, PLLC

(57) ABSTRACT

A varifocal lens includes a first phase plate and a second phase plate which are rotatable relative to each other about an optical axis. The first phase plate includes a plurality of first phase conversion elements, the second phase plate includes a plurality of second phase conversion elements, and the plurality of first phase conversion elements and the plurality of second phase conversion elements are arranged so that light transmitted through the first phase plate and the second phase plate is focused on different positions on the optical axis depending on a relative rotational displacement between the first phase plate and the second phase plate.

20 Claims, 10 Drawing Sheets

Related U.S. Application Data continuation of application No. 15/692,537, filed on Aug. 31, 2017, now Pat. No. 10,261,294.

(51) Int. Cl.
| | | |
|---|---|---|
| *G02B 3/00* | (2006.01) | |
| *G02B 15/02* | (2006.01) | |
| *G02B 15/24* | (2006.01) | |
| *G02B 26/08* | (2006.01) | |
| *G02B 5/18* | (2006.01) | |

(52) U.S. Cl.
CPC ......... *G02B 3/0068* (2013.01); *G02B 3/0081* (2013.01); *G02B 15/02* (2013.01); *G02B 15/24* (2013.01); *G02B 5/1809* (2013.01); *G02B 2207/107* (2013.01)

(58) Field of Classification Search
CPC . G02B 15/02; G02B 3/0081; G02B 2207/107
See application file for complete search history.

(56) References Cited

U.S. PATENT DOCUMENTS

| | | |
|---|---|---|
| 8,335,034 B2 | 12/2012 | Bernet et al. |
| 8,830,556 B2 | 9/2014 | Smith et al. |
| 2005/0195502 A1 | 9/2005 | Jeong et al. |
| 2014/0277436 A1 | 9/2014 | Pugh et al. |
| 2014/0285905 A1 | 9/2014 | Zhou et al. |
| 2015/0219806 A1 | 8/2015 | Arbabi et al. |

OTHER PUBLICATIONS

Amir Arbabi et al., "Dielectric metasurfaces for complete control of phase and polarization with subwavelength spatial resolution and high transmission", Nature Nanotechnology, vol. 10, Nov. 1, 2015, pp. 937-944 (Eight (8) pages total).

Communication dated Mar. 28, 2018 by the European Patent Office in counterpart European Patent Application No. 17190930.2.

Notice of Allowance issued in parent U.S. Appl. No. 15/692,537 dated Dec. 3, 2018.

Shane Colburn et al., "Metasurace-based freeform optics for biosensing and augmented reality systems", 2016 Conference on Lasers and Electro-Optics (CLEO), OSA. Jun. 5, 2016, pp. 1-2, XP033024495.

Stefan Bernet et al., "Adjustable refractive power from diffractive moire' elements", Applied Optics, vol. 47, No. 21, Jul. 20, 2008, pp. 3722-3730 (Nine (9) pages total).

Stefan Bernet et al., "Demonstration of focus-tunable diffractive Moire-lenses", Optics Express, vol. 21, No. 6, Mar. 25, 2013, pp. 6955-6966, XP055189028.

Notice of Allowance issued in parent U.S. Appl. No. 16/291,552 dated Mar. 23, 2020.

Communication dated Feb. 1, 2021 by the China National Intellectual Property Administration in corresponding Chinese Application No. 201710913038.1.

ROTATIONAL VARIFOCAL PLANAR LENS

CROSS-REFERENCE TO RELATED APPLICATION

This is a continuation of U.S. application Ser. No. 16/291,552 filed on Mar. 4, 2019, which is a continuation of U.S. application Ser. No. 15/692,537 filed on Aug. 31, 2017 (now U.S. Pat. No. 10,261,294), which claims priority from Korean Patent Application No. 10-2016-0127546, filed on Oct. 4, 2016 in the Korean Intellectual Property Office, the disclosures of which are incorporated herein in their entirety by reference.

BACKGROUND

1. Field

Apparatuses consistent with the present disclosure relate to varifocal lenses in which focus changes as focal length changes, and more particularly, to rotational varifocal planar lenses capable of being fabricated in a planar form with a small thickness.

2. Description of the Related Art

Similar to compact cameras and cameras for mobile devices, mirrorless cameras and single-lens reflex cameras being fabricated to have smaller sizes. Accordingly, lenses for small cameras are required. Until now, most lenses for small cameras have been designed as fixed focus lenses, that is, lenses with a fixed focal length. However, since the angle of view of the fixed focal length lens is fixed, it is difficult to take a picture with various effects. In particular, compact cameras or cameras for mobile devices are generally designed to be suitable for close-up photography, and thus, may not be suitable for long-distance photography.

A multifocal lens having multiple focal lengths or a zoom lens having a variable focal length is widely used as a lens for taking a picture from both a short distance away from the object being photographed and a long distance away from the object being photographed. However, since the zoom lens is usually composed of a plurality of lens elements, a camera using the zoom lens is long and heavy.

SUMMARY

Exemplary embodiments provide varifocal lenses including a first phase plate and a second phase plate which are rotatable relative to each other about an optical axis.

According to an aspect of an exemplary embodiment, there is provided a first phase plate including a plurality of first phase conversion elements, at least some of the plurality of first phase conversion elements having diameters that are different from each other; and a second phase plate including a plurality of second phase conversion elements, at least some of the plurality of first phase conversion elements having diameters that are different from each other, wherein the first phase plate and the second phase plate face each other along an optical axis and are rotatable relative to each other about the optical axis to create relative rotational displacement between the first phase plate and the second phase plate, and the plurality of first phase conversion elements and the plurality of second phase conversion elements are configured so that light transmitted through the first phase plate and the second phase plate is focused on different positions on the optical axis depending on the relative rotational displacement between the first phase plate and the second phase plate.

The plurality of first phase conversion elements and the plurality of second phase conversion elements may have radially symmetric column shapes, wherein the plurality of first phase conversion elements may have different diameters from each other depending on positions of the plurality of first phase conversion elements on the first phase plate so that a phase of light transmitted through the first phase plate changes differently depending on the positions of the plurality of first phase conversion elements on the first phase plate, and the plurality of second phase conversion elements may have different diameters from each other depending on positions of the plurality of second phase conversion elements on the second phase plate so that a phase of light transmitted through the second phase plate changes differently depending on the positions of the plurality of second phase conversion elements on the second phase plate.

The diameters of the plurality of first phase conversion elements according to the positions of the plurality of first phase conversion elements on the first phase plate and the diameters of the plurality of second phase conversion elements according to the positions of the plurality of second phase conversion elements on the second phase plate may be determined so that the phase of light transmitted through each of the first phase plate and the second phase plate is proportional to a square of a radial distance with respect to the optical axis and proportional to an azimuth angle.

Each of the first phase plate and the second phase plate may be spatially divided into at least two regions in at least one of an azimuth direction and a radial direction, and the plurality of first phase conversion elements may be arranged in the at least two regions of the first phase plate and the plurality of second phase conversion elements may be arranged in the at least two regions of the second phase plate so that the at least two regions of each of the first phase plate and the second phase plate have operating wavelengths that are different from each other.

Thicknesses of the plurality of first phase conversion elements may be equal to thicknesses of the plurality of second phase conversion elements.

The first phase plate may further include a first substrate that is transparent and the plurality of first phase conversion elements are arranged on the first substrate at regular intervals in a square lattice or hexagonal lattice shape, and the second phase plate may further include a second substrate that is transparent and the plurality of second phase conversion elements are arranged on the second substrate at regular intervals in a square lattice or hexagonal lattice shape.

A space between the plurality of first phase conversion elements and a space between the plurality of second phase conversion elements may be less than an operating wavelength.

Each of the plurality of first phase conversion elements and each of the plurality of second phase conversion elements may include a material having a refractive index higher than that of the first substrate and the second substrate.

Each of the first substrate and the second substrate may have a flat plate shape, and the first phase plate and the second phase plate may be arranged so that the plurality of first phase conversion elements and the plurality of second phase conversion elements face each other.

The first phase plate may further include a first dielectric layer provided on the first substrate and filling spaces between the plurality of first phase conversion elements, the second phase plate may further include a second dielectric layer provided on the second substrate and filling spaces between the plurality of second phase conversion elements, and each of the first dielectric layer and the second dielectric layer may be transparent.

A thickness of the first dielectric layer may be greater than thicknesses of the plurality of first phase conversion elements so that the first dielectric layer completely covers the plurality of first phase conversion elements, and a thickness of the second dielectric layer may be greater than thicknesses of the plurality of second phase conversion elements so that the second dielectric layer completely covers the plurality of second phase conversion elements.

The first phase plate and the second phase plate may be arranged so that the first dielectric layer and the second dielectric layer are in contact with each other.

When the relative rotational displacement between the first phase plate and the second phase plate is 0, a refractive power of the varifocal lens may be greater than 0, and the plurality of first phase conversion elements and the plurality of second phase conversion elements may be arranged so that the refractive power of the varifocal lens is proportional to the relative rotational displacement between the first phase plate and the second phase plate.

The varifocal lens may further include: a third phase plate including a plurality of third phase conversion elements, at least some of the plurality of third phase conversion elements having diameters that are different from each other; and a fourth phase plate including a plurality of fourth phase conversion elements, at least some of the plurality of fourth phase conversion elements having diameters that are different from each other, wherein the plurality of first phase conversion elements and the plurality of second phase conversion elements are configured so that the first phase plate and the second phase plate collectively function as a first lens element, and the plurality of third phase conversion elements and the plurality of fourth phase conversion elements are configured so that the third phase plate and the fourth phase plate collectively function as a second lens element.

The first phase plate, the second phase plate, the third phase plate, and the fourth phase plate may be sequentially arranged along the optical axis, the third phase plate and the fourth phase plate may be rotatable relative to each other about the optical axis to create relative rotational displacement between the third phase plate and the fourth phase plate, and the plurality of third phase conversion elements and the plurality of fourth phase conversion elements may be configured so that light transmitted through the third phase plate and the fourth phase plate is focused on different positions on the optical axis depending on the relative rotational displacement between the third phase plate and the fourth phase plate.

Each of the plurality of third phase conversion elements and each of the plurality of fourth phase conversion elements may have a radially symmetric column shape, the plurality of third phase conversion elements may have different diameters from one another depending on positions of the plurality of third phase conversion elements on the third phase plate so that a phase of light transmitted through the third phase plate changes differently depending on the positions of the plurality of third phase conversion elements on the third phase plate, and the plurality of fourth phase conversion elements may have different diameters from one another depending on positions of the plurality of fourth phase conversion elements on the fourth phase plate so that a phase of light transmitted through the fourth phase plate changes differently depending on the positions of the plurality of fourth phase conversion elements on the fourth phase plate.

The diameters of the plurality of third phase conversion elements according to the positions of the plurality of third phase conversion elements on the third phase plate and the diameters of the plurality of fourth phase conversion elements according to the positions of the plurality of fourth phase conversion elements on the fourth phase plate may be determined so that the phase of light transmitted through each of the third phase plate and the fourth phase plate is proportional to a square of a radial distance with respect to the optical axis and proportional to an azimuth angle.

The first lens element and the second lens element may have refractive powers with a same sign, and the plurality of first phase conversion elements, the plurality of second phase conversion elements, the plurality of third phase conversion elements, and the plurality of fourth phase conversion elements may be arranged so that a degree of change of a refractive power of the first lens element with respect to the relative rotational displacement between the first phase plate and the second phase plate is equal to a degree of change of a refractive power of the second lens element with respect to relative rotational displacement between the third phase plate and the fourth phase plate.

The plurality of first phase conversion elements, the plurality of second phase conversion elements, the plurality of third phase conversion elements, and the plurality of fourth phase conversion elements may be arranged so that the first lens element and the second lens element have refractive powers with opposite signs, the plurality of first phase conversion elements and the plurality of second phase conversion elements are arranged in a same form, and the plurality of third phase conversion elements and the plurality of fourth phase conversion elements are arranged in a same form.

The first lens element and the second lens element may have refractive powers with a same sign, and the plurality of first phase conversion elements, the plurality of second phase conversion elements, the plurality of third phase conversion elements, and the plurality of fourth phase conversion elements are arranged so that a degree of change of a refractive power of the first lens element with respect to the relative rotational displacement between the first phase plate and the second phase plate is different from a degree of change of a refractive power of the second lens element with respect to relative rotational displacement between the third phase plate and the fourth phase plate.

According to an aspect of another exemplary embodiment, there is provided an image acquisition device including: a varifocal lens including a first phase plate including a plurality of first phase conversion elements, at least some of the plurality of first phase conversion elements having diameters that are different from each other, and a second phase plate including a plurality of second phase conversion elements, at least some of the plurality of second phase conversion elements having diameters that are different from each other; an actuator configured to rotationally displace the first phase plate and the second phase plate relative to each other; a controller configured to control the actuator to create a relative rotational displacement between the first phase plate and the second phase plate; and an image pickup device, wherein the first phase plate and the second phase plate face each other along an optical axis and are rotatable relative to each other about the optical axis, and the plurality of first phase conversion elements and the plurality of second phase conversion elements are arranged so that light transmitted through the first phase plate and the second phase plate is focused on different positions on the optical axis depending on the relative rotational displacement between the first phase plate and the second phase plate.

Additional aspects will be set forth in part in the description which follows and, in part, will be apparent from the description, or may be learned by practice of the presented embodiments.

BRIEF DESCRIPTION OF THE DRAWINGS

The above and/or other aspects will become apparent and more readily appreciated from the following description of exemplary embodiments, taken in conjunction with the accompanying drawings in which.

DETAILED DESCRIPTION

Figure 1:
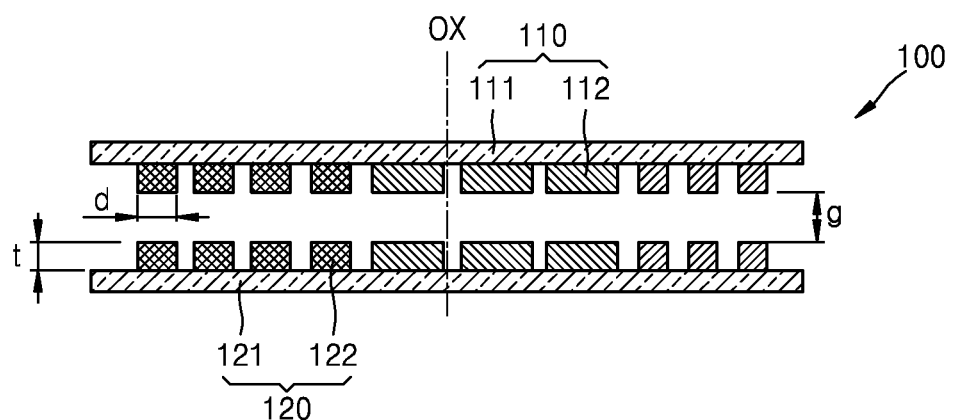
FIG. 1 is a cross-sectional view of a varifocal lens according to an exemplary embodiment.

Hereinafter, with reference to the accompanying drawings, exemplary embodiments will be described in detail. Like reference numerals refer to like elements throughout, and in the drawings, sizes of elements may be exaggerated for clarity and convenience of explanation. The embodiments described below are merely exemplary, and various modifications may be possible from the embodiments. In a layer structure described below, an expression such as "above" or "on" may include not only the meaning of "immediately on/under/to the left/to the right in a contact manner", but also the meaning of "on/under/to the left/to the right in a non-contact manner".

FIG. 1 is a cross-sectional view of a varifocal lens 100 according to an exemplary embodiment. Referring to FIG. 1, the varifocal lens 100 according to the exemplary embodiment may include a first phase plate 110 and a second phase plate 120 arranged to face each other along an optical axis OX and configured to be rotatable relative to each other about the optical axis OX. The first phase plate 110 may include a first substrate 111, which is transparent, and a plurality of first phase conversion elements 112 arranged two-dimensionally on a surface of the first substrate 111 facing the second phase plate 120. The second phase plate 120 may include a second substrate 121, which is transparent, and a plurality of second phase conversion elements 122 arranged two-dimensionally on a surface of the second substrate 121 facing the first phase plate 110. That is, the first phase plate 110 and the second phase plate 120 may be arranged so that the first phase conversion elements 112 and the second phase conversion elements 122 face each other. The first phase conversion elements 112 and the second phase conversion elements 122 may not be in contact with each other so that damage does not occur when the first phase plate 110 and the second phase plate 120 rotate relative to each other. According to an exemplary embodiment, the first phase conversion element 112 and the second phase conversion element 122 may be spaced apart from each other by a distance g.

Figure 2:
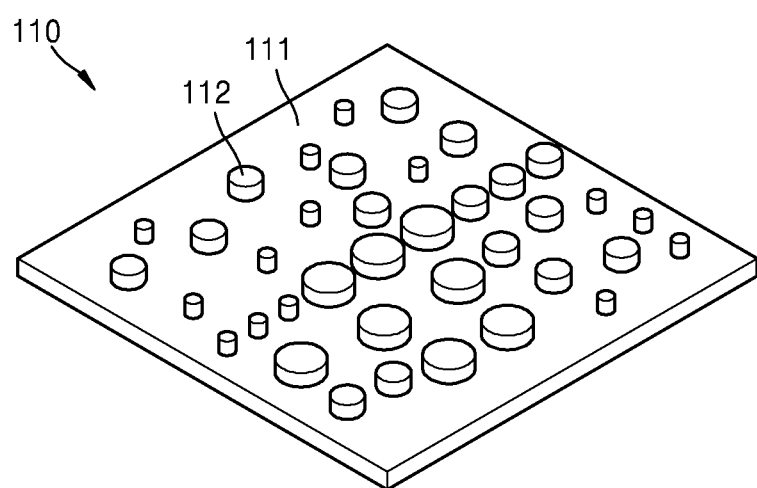
FIG. 2 is a perspective view of a phase plate of the varifocal lens shown in FIG. 1.

The first phase conversion element 112 and the second phase conversion element 122 may protrude above the surface of the first substrate 111 and the surface of the second substrate 121, respectively. For example, FIG. 2 is a perspective view of the first phase plate 110 of the varifocal lens 100 shown in FIG. 1. As shown in FIG. 2, the first phase conversion elements 112 may be two-dimensionally arranged on the first substrate 111 to form a predetermined pattern. For example, the first phase conversion elements 112 may be arranged at regular intervals in the form of a square lattice or hexagonal lattice, and the second phase conversion elements 122 may also be arranged in the form of a square lattice or hexagonal lattice. Here, the interval between adjacent first phase conversion elements 112 or the period of arrangement of the first phase conversion elements 112 may be less than an operating wavelength of the varifocal lens 100. By reducing the interval between the adjacent first phase conversion elements 112, it is possible to suppress the generation of a higher order diffraction component.

Each of the first phase conversion elements 112 may have, for example, a cylindrical shape. Each of the second phase conversion elements 122 may also have a cylindrical shape. However, the first and second phase conversion elements 112 and 122 do not necessarily have to have a cylindrical shape, but instead may have the form of a radially symmetric polygonal column, such as a square column or a hexagonal column. The first and second phase conversion elements 112 and 122 may be formed using a general semiconductor patterning process, although are not limited thereto and may also be formed using many other types of processes. For example, after stacking the material layers of the first and second phase conversion elements 112 and 122 on the surfaces of the first and second substrates 111 and 121, respectively, the first and second phase conversion elements 112 and 122 may be formed simply by patterning the material layers by using a photolithography process or some other type of process known to those skilled in the art.

The first substrate 111 and the second substrate 121 may include, for example, a transparent glass plate, a transparent plastic material or a combination thereof. The first and second phase conversion elements 112 and 122 may include a material having a refractive index higher than a refractive index of a material of the first and second substrates 111 and 121. For example, the first and second phase conversion elements 112 and 122 may include a high refractive index material, such as germanium (Ge), amorphous silicon (a-Si), polycrystalline silicon (p-Si), monocrystalline silicon (c-Si), group III-V compound, $TiO_2$, or SiNx, although they are not limited thereto. For example, the refractive index of the first and second phase conversion elements 112 and 122 may be greater than 3.5 at a visible light wavelength. It is understood, of course, that the refractive index of the first and second phase conversion elements 112 and 122 may also be equal to or less than 3.5.

When incident light passes through the first and second phase conversion elements 112 and 122 having the high refractive indexes, the phase of the incident light is delayed by the first and second phase conversion elements 112 and 122, and the phase of a transmitted light transmitted through the first and second phase conversion elements 112 and 122 is different from the phase of the incident light. The extent to which the phase of the incident light changes may be determined depending on the sizes and the thicknesses t of the first and second phase conversion elements 112 and 122. If the first and second phase conversion elements 112 and 122 have, for example, a shape of the form of a polygonal column, the phase of the transmitted light changes depending on the diameters d and the thicknesses t of the first and second phase conversion elements 112 and 122.

Figure 3:
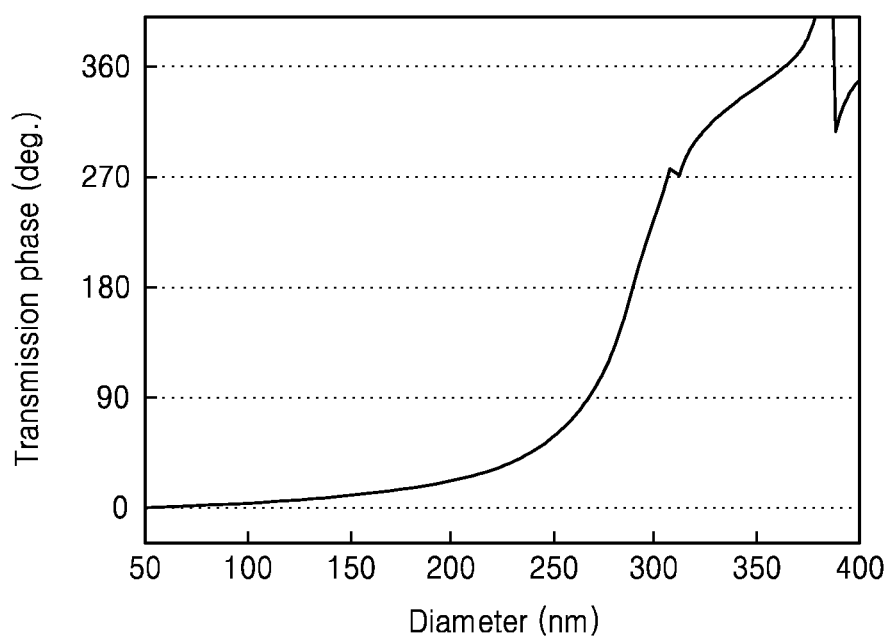
FIG. 3 is a graph illustrating a relationship between a diameter of one of phase conversion elements arranged in a phase plate and a phase change of transmitted light.

For example, FIG. 3 is a graph illustrating the relationship between the diameter of one of the first and second phase conversion elements 112 and 122, respectively arranged in the first and second phase plates 110 and 120, and a phase change of the transmitted light. In the graph of FIG. 3, it is assumed that each of the first and second phase conversion elements 112 and 122 has the form of a cylinder including amorphous silicon, is arranged in the form of a hexagonal lattice with a period of 650 nm, and has a thickness of 715 nm. In addition, it is assumed that the wavelength of the incident light is 950 nm. However, exemplary embodiments are not limited thereto. For example, the first and second phase conversion elements 112 and 122 may include materials other than, or in addition to, amorphous silicon, and may have a period of more or less than 650 nm and a thickness of more or less than 715 nm. Referring to FIG. 3, the diameters of the first and second phase conversion elements 112 and 122 and the phase change are not linearly related but nonlinearly related. However, it may be understood that the phase change increases as the diameters of the first and second phase conversion elements 112 and 122 increases.

Accordingly, when at least some of the first and second phase conversion elements 112 and 122 have different sizes or different thicknesses, the transmitted light transmitted through the first and second phase plates 110 and 120 may have different phases depending on local positions of the first and second phase conversion elements 112 and 122 on the first and second plates 110 and 120. That is, the phase of the transmitted light changes locally depending on the positions of the first and second phase conversion elements 112 and 122 on the first and second phase plates 110 and 120. By appropriately arranging the plurality of first and second phase conversion elements 112 and 122 having different sizes or different thicknesses, it is possible to control, as desired, the wave front of the transmitted light transmitted through the first and second phase plates 110 and 120. For example, depending on the arrangement of the first and second phase conversion elements 112 and 122, the first and second phase plates 110 and 120 may serve as refractive optical elements such as lenses. The first and second phase plates 110 and 120 may also serve as other types of optical elements in addition to or instead of lenses.

According to the present exemplary embodiment, the arrangement of the first and second phase conversion elements 112 and 122 may be designed so that the phase distribution of the transmitted light transmitted through the first and second phase plates 110 and 120 is proportional to the product of the square of a radial distance from the optical axis OX and an azimuth angle, as shown in Equation 1, and the first phase plate 110 and the second phase may be disposed to face each other. In Equation 1, 4 represents a phase change of transmitted light, r represents a radial distance from an optical axis OX, a represents an azimuth angle, and a represents a proportional constant.

$$\phi = a\theta r^2 \qquad \text{[Equation 1]}$$

Then, when the first phase plate 110 and the second phase plate 120 are rotated relative to each other about the optical axis OX, the total phase change of the varifocal lens 100, which is caused by a combination of the first phase plate 110 and the second phase plate 120, varies depending on the relative rotational displacement between the first phase plate 110 and the second phase plate 120. For example, the refractive power of the varifocal lens 100 may be changed according to the relative rotational displacement and the displacement direction of the first phase plate 110 and the second phase plate 120 so that the focal length of the varifocal lens 100 is changed. To this end, the first and second phase conversion elements 111 and 122 may be arranged so that light transmitted through the first phase plate 110 and the second phase plate 120 is focused on different positions on the optical axis OX according to the relative rotational displacement between the first phase plate 110 and the second phase plate 120. That is, the first and second phase conversion elements 112 and 122 may be arranged so that the phase distribution of the transmitted light transmitted through the first and second phase plates 110 and 120 is as shown in Equation 1.

Figure 4:
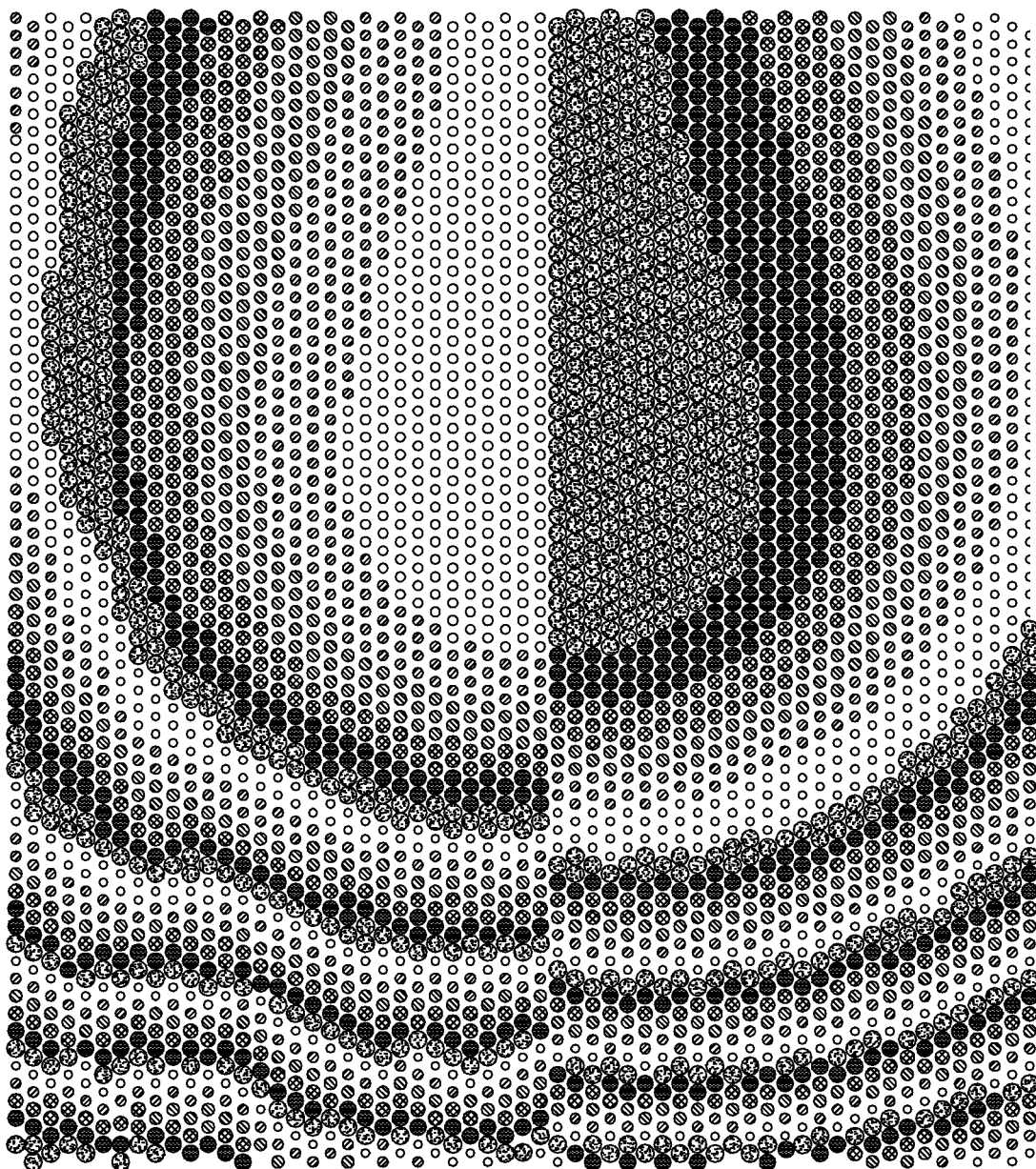
FIG. 4 is a plan view illustrating an arrangement of a plurality of first phase conversion elements of a first phase plate, according to an exemplary embodiment.

For example, FIG. 4 is a plan view illustrating the arrangement of a plurality of first phase conversion elements 112 of the first phase plate 110, according to an exemplary embodiment. Referring to FIG. 4, the plurality of first phase conversion elements 112 have different diameters depending on their positions on the first phase plate 110 so that the phase of light transmitted through the first phase plate 110 changes differently depending on the positions of the first phase conversion elements 112 on the first phase plate 110. The second phase plate 120 may also be designed in the same manner as the phase plate 110. That is, the plurality of second phase conversion elements 122 may have different diameters depending on their local positions on the second phase plate 120 so that the phase of light transmitted through the second phase plate 120 changes differently depending on their local positions on the second phase plate 120. The diameters of the first phase conversion elements 112 are illustratively shown in FIG. 4. The diameters of the plurality of first phase conversion elements 112, which are different from each other depending on their positions on the first phase plate 110, may be selected so that the phase of light transmitted through the first phase plate 110 satisfies a condition as shown in Equation 1. Similarly, the diameters of the plurality of second phase conversion elements 122, which are different from each other depending on their positions on the second phase plate 120, may be selected so that the phase of light transmitted through the second phase plate 120 satisfies a condition as shown in Equation 1.

When the phase change $\phi$ at a position of each of the first and second phase plates 110 and 120 is determined, the diameters of the first and second phase conversion elements 112 and 122 at the respective positions of the first and second phase plates 110 and 120 may be determined based on the relationship between the diameters of the first and second phase conversion elements 112 and 122 and a phase change of transmitted light, illustrated in FIG. 3. The phase change of the transmitted light may be affected by the thicknesses of the first and second phase conversion elements 112 and 122. However, when the thicknesses of the first and second phase conversion elements 112 and 122 are different from each other, a process of manufacturing the first and second phase plates 110 and 120 may be complicated, and thus, for example, the first and second phase conversion elements 112 and 122 may be formed to have the same thickness of 715 nm.

Figure 5:
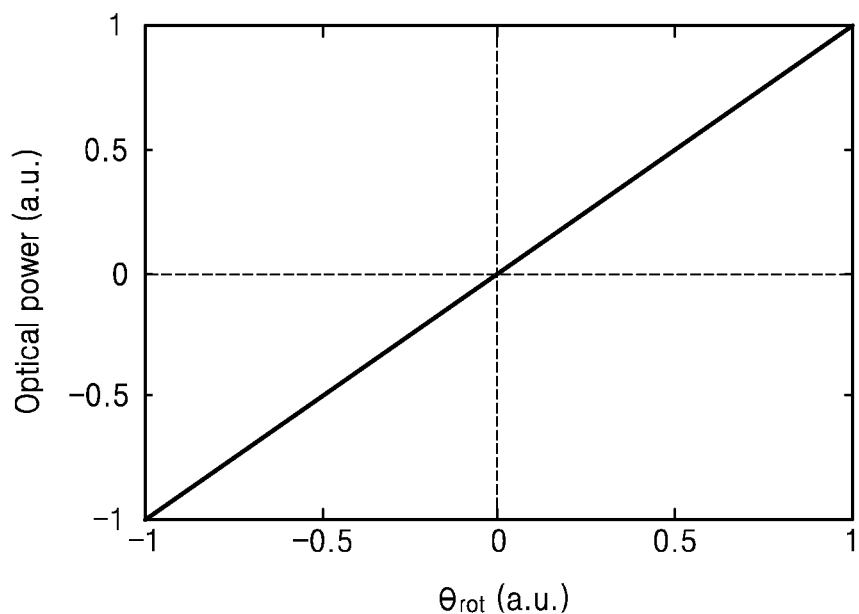
FIG. 5 is a graph showing a relationship between a rotational displacement between a first phase plate and a second phase plate and a refractive power of a varifocal lens.

FIG. 5 is a graph showing the relationship between the rotational displacement between the first phase plate 110 and the second phase plate 120 and the refractive power of the varifocal lens 100 in the case in which the arrangement of the first phase conversion elements 112 of the first phase plate 110 and the arrangement of the second phase conversion elements 122 of the second phase plate 120 are identical to each other. Referring to FIG. 5, it may be understood that the refractive power of the varifocal lens 100 has a linear proportional relation to the rotational displacement. For example, when the rotational displacement is 0, the varifocal lens 100 has a refractive power of 0, and as the rotational displacement increases or decreases, the refractive power of the varifocal lens 100 may also increase or decrease in proportion thereto. The focal length of the varifocal lens 100 may be represented as shown in Equation 2 as the reciprocal of the refractive power.

$$f^{-1} = \frac{a\theta_{rot}\lambda}{\pi} \quad \text{[Equation 2]}$$

In Equation 2, f represents a focal length, $\theta_{rot}$ represents rotational displacement λ represents the wavelength of incident light, and a represent a proportional constant as shown in Equation 1. The refractive power $f^{-1}$ may be proportional to the rotational displacement $\theta_{rot}$, as shown in Equation 2. Optical characteristics of the varifocal lens 100 may be determined mainly by the proportional constant a. For example, if the proportional constant a is a positive number, the varifocal lens 100 may have a positive refractive power when positive rotational displacement occurs, and as the magnitude of the proportional constant increases, a change in the refractive power due to the rotational displacement may also increase. Therefore, after the proportional constant a is determined depending on desired characteristics of the varifocal lens 100, the arrangement of the first phase conversion elements 112 and the second phase conversion elements 122 may be designed to satisfy the condition of Equation 1.

Figure 6:
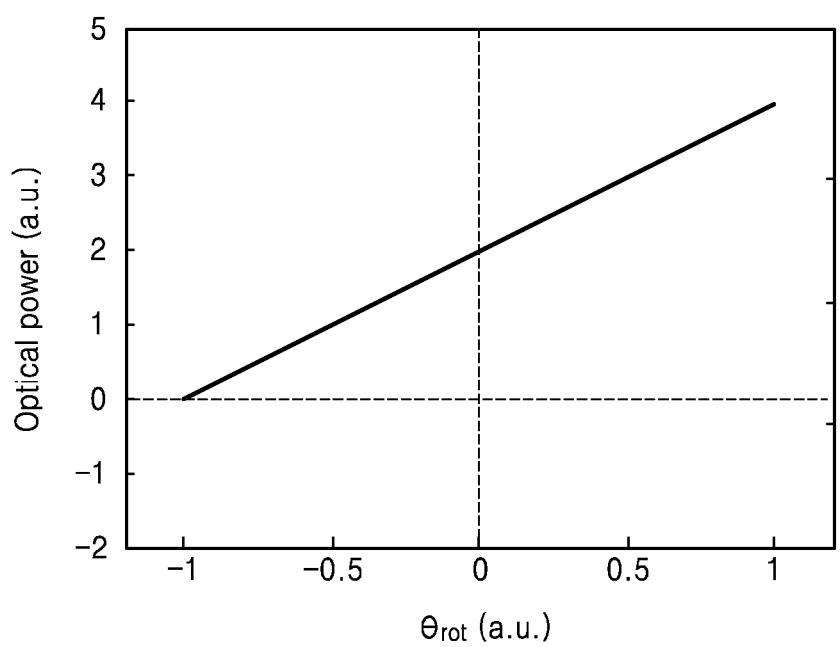
FIG. 6 is a graph showing a relationship between the rotational displacement between a first phase plate and a second phase plate and a refractive power of a varifocal lens, according to another exemplary embodiment.

In the example of FIG. 5, the refractive power is 0 when the rotational displacement is 0. However, an initial offset value may be given so as to have a refractive power even when there is no rotational displacement. FIG. 6 is a graph showing the relationship between the rotational displacement between the first phase plate 110 and the second phase plate 120 and the refractive power of the varifocal lens 100, according to another exemplary embodiment. Referring to FIG. 6, the varifocal lens 100 has a refractive power greater than 0 when the rotational displacement is 0. As the relative rotational displacement between the first phase plate 110 and the second phase plate 120 increases or decreases, the refractive power may increase or decrease in proportion thereto. For example, when the rotational displacement is 0, the arrangement of the first phase conversion elements 112 and the arrangement of the second phase conversion elements 112 may be designed so that the second phase conversion elements 122 are rotated by the initial offset value with respect to the first phase conversion elements 112.

The varifocal lens 100 according to the present exemplary embodiment may be formed in a planar shape and thus may have a small thickness. For example, the varifocal lens 100 may have a small thickness of several um to several mm. Thus, the varifocal lens 100 may provide a zoom function to a compact camera or a camera for a mobile device. In addition, since the varifocal lens 100 according to the present exemplary embodiment may be manufactured by a patterning method using a photolithography process, a complicated processing step for forming a complex curved surface of an optical lens element is not required. Accordingly, the varifocal lens 100 may be easily manufactured and quality deterioration due to a process error may be reduced, and thus, image quality may be improved. Furthermore, since the refractive power may be changed by simply rotating the first phase plate 110 or the second phase plate 120, it is not necessary to secure an additional space for adjusting the refractive power. Also, since a phase change is given in the form of a quadratic polynomial with respect to a radial distance, as shown in Equation 1, a phase distribution change at a position away from the optical axis OX is relatively small. Therefore, it is easy to design a varifocal lens having a large diameter.

Figure 7:
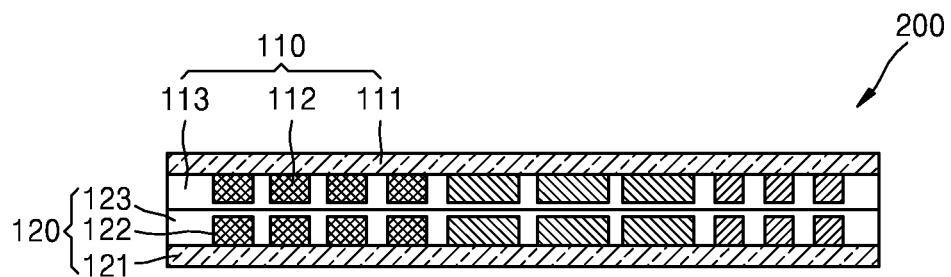
FIG. 7 is a cross-sectional view of a varifocal lens according to another exemplary embodiment.

FIG. 7 is a cross-sectional view of a varifocal lens 200 according to another exemplary embodiment. Referring to FIG. 7, the varifocal lens 200 may further include first and second dielectric layers 113 and 123 that are transparent and surround and protect first and second phase conversion elements 112 and 122. For example, a first phase plate 110 may include the first dielectric layer 113 filled between a plurality of first phase conversion elements 112, and a second phase plate 120 may include the second dielectric layer 123 filled between a plurality of second phase conversion elements 122. The first and second dielectric layers 113 and 123 may include a material such as siloxane-based spin on glass (SAG), transparent polymer material, $SiO_2$, or the like.

In order to sufficiently protect the first and second phase conversion elements 112 and 122, the thickness of the first dielectric layer 113 may be greater than that of the first phase conversion element 112 to completely cover the first phase conversion element 112, and the thickness of the second dielectric layer 123 may be greater than that of the second phase conversion element 122 to completely cover the second phase conversion element 122. In this case, the first and second phase conversion elements 112 and 122 may not be damaged when the first phase plate 110 and the second phase plate 120 are relatively rotated. Accordingly, as shown in FIG. 7, the first phase plate 110 and the second phase plate 120 may be disposed so that the first dielectric layer 113 and the second dielectric layer 123 are in contact with each other.

Figure 8:
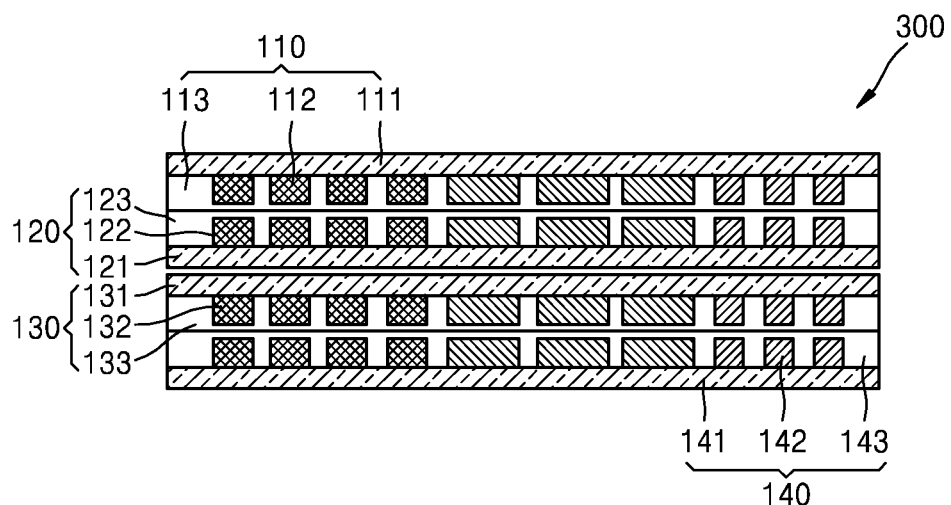
FIG. 8 is a cross-sectional view of a varifocal lens according to another exemplary embodiment, which include two lens elements.

FIG. 8 is a cross-sectional view of a varifocal lens 300 according to another exemplary embodiment. Referring to FIG. 8, the varifocal lens 300 may further include a third phase plate 130 and a fourth phase plate 140 in addition to a first phase plate 110 and a second phase plate 120. For example, the first phase plate 110 to the fourth phase plate 140 may be sequentially disposed along an optical axis. The third phase plate 130 may include a third substrate 131, a plurality of third phase conversion elements 132 having different sizes, and a third dielectric layer 133 for protecting the third phase conversion elements 132. The fourth phase plate 140 may include a fourth substrate 141, a plurality of fourth phase conversion elements 142 having different sizes, and a fourth dielectric layer 143 for protecting the fourth phase conversion elements 142.

A plurality of first phase conversion elements 112 and a plurality of second phase conversion elements 122 may be arranged so that a pair of the first and second phase plates 110 and 120 functions as a first lens element. A plurality of third phase conversion elements 132 and a plurality of fourth phase conversion elements 142 may be arranged so that a pair of the third and fourth phase plates 130 and 140 functions as a second lens element. The first phase plate 110 and the second phase plate 120 may be configured to be rotatable relative to each other about the optical axis, and the third phase plate 130 and the fourth phase plate 140 may be configured to be rotatable relative to each other in the direction perpendicular to the optical axis. The first and second phase conversion elements 112 and 122 may be arranged so that light transmitted through the first phase plate 110 and the second phase plate 120 is focused on different positions on the optical axis depending on the relative rotational displacement between the first phase plate 110 and the second phase plate 120. Similarly, the third and fourth phase conversion elements 132 and 142 may be arranged so that light transmitted through the third phase plate 130 and the fourth phase plate 140 is focused on different positions on the optical axis depending on the relative rotational displacement between the third phase plate 130 and the fourth phase plate 140. Accordingly, the focal length of the varifocal lens 300 may vary depending on the relative rotational displacement between the first phase plate 110 and the second phase plate 120 and the relative rotational displacement between the third phase plate 130 and the fourth phase plate 140.

As described above with reference to FIGS. 2 and 3, the first to fourth phase conversion elements 112, 122, 132, and 142 may have the form of a cylindrical or polygonal column with a radially symmetric shape. The first to fourth phase conversion elements 112, 122, 132, and 142 may have different diameters depending on local positions on the first to fourth phase plates 110, 120, 130, and 140, respectively, so that the phase of light transmitted through the first to fourth phase plates 110, 120, 130 and 140 changes differently depending on the local positions on the first to fourth phase plates 110, 120, 130, and 140. For example, the diameters of the first and second phase conversion elements 112 and 122 may be selected so that the phase of light transmitted through each of the first and second phase plates 110 and 120 is proportional to the square of a radial distance about the optical axis and is proportional to an azimuth angle. Similarly, the diameters of the third phase conversion elements 132 according to their positions on the third phase plate 130 and the diameters of the fourth phase conversion elements 142 according to their positions on the fourth phase plate 140 may be determined so that the phase of light transmitted through each of the third and fourth phase plates 130 and 140 is proportional to the square of the radial distance about the optical axis and proportional to the azimuth angle.

In the varifocal lens 300 according to the present exemplary embodiment, the first lens element including the pair of the first and second phase plates 110 and 120 and the second lens element including the pair of the third and fourth phase plates 130 and 140 may be designed to have the same optical characteristics or may be designed to have different optical characteristics.

Figure 9:
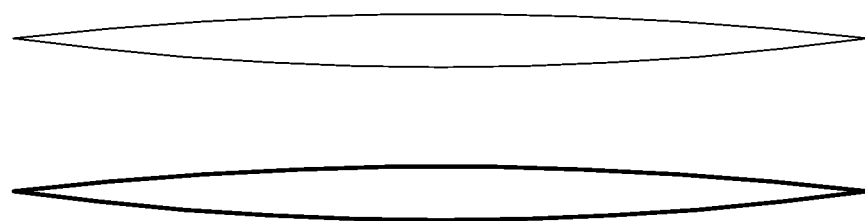
FIG. 9 is a cross-sectional view showing a configuration of an optical lens equivalent to a varifocal lens when two lens elements are the same.
Figure 10:
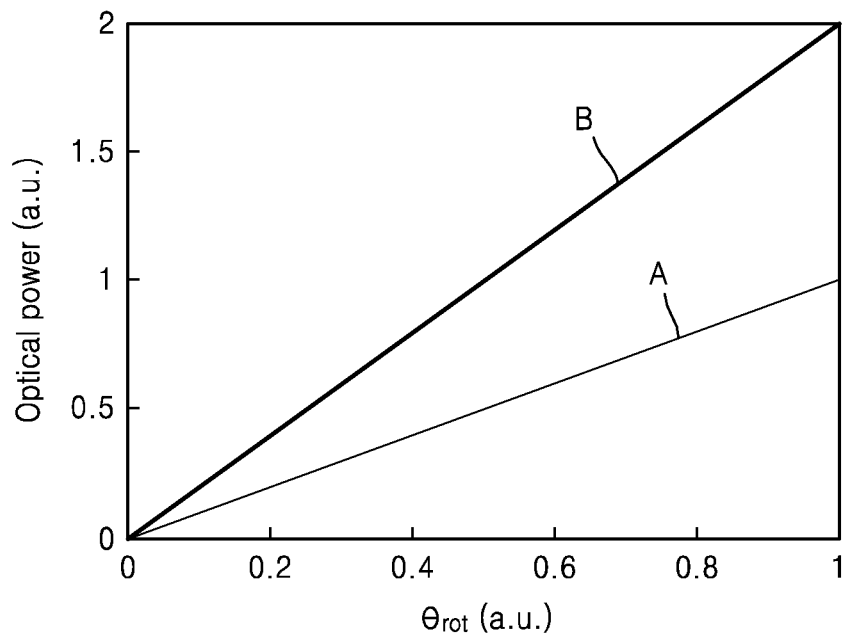
FIG. 10 is a graph showing a relationship between a rotational displacements between a first phase plate and a second phase plate and between a third phase plate and a fourth phase plate and a refractive power of the varifocal lens, with respect to the example of FIG. 9.

For example, FIG. 9 is a cross-sectional view showing a configuration of an optical lens equivalent to the varifocal lens 300 when two lens elements, i.e., first and second lens elements, are the same, and FIG. 10 is a graph showing the relationship between the rotational displacements between the first phase plate 110 and the second phase plate 120 and between the third phase plate 130 and the fourth phase plate 140 and the refractive power of the varifocal lens 300. Referring to FIG. 9, both the first lens element and the second lens element are designed to have a positive refractive power like a convex lens. The degree of change of the refractive power of the first lens element with respect to the relative rotational displacement between the first phase plate 110 and the second phase plate 120 is equal to the degree of change of the refractive power of the second lens element with respect to the relative rotational displacement between the third phase plate 130 and the fourth phase plate 140. To this end, the proportional constant a of Equation 1 may be selected equally for the first lens element and the second lens element. For example, the first to fourth phase conversion elements 112, 122, 132, and 142 may all be arranged in the same form.

Referring to FIG. 10, a line indicated by 'A' represents a change in the refractive power of each of the first lens element and the second lens element, and a line indicated by 'B' represents the overall change in the refractive power of the varifocal lens 300. As shown in FIG. 10, the overall change in the refractive power of the varifocal lens 300 is the sum of the change in the refractive power of the first lens element and the change in the refractive power of the second lens element. Therefore, the range of change in the refractive power of the varifocal lens 300 may be increased. In general, even if the proportional constant a is increased, a large refractive power change may be obtained. However, if the proportion constant a increases, a phase change rapidly increases at the edge of a phase plate, and thus, it may be difficult to design and manufacture phase conversion elements. Therefore, when the two lens elements are combined as shown in FIG. 9, it is possible to increase a change in the refractive power of the varifocal lens 300 in a range in which phase conversion elements may be designed and manufactured.

Figure 11:
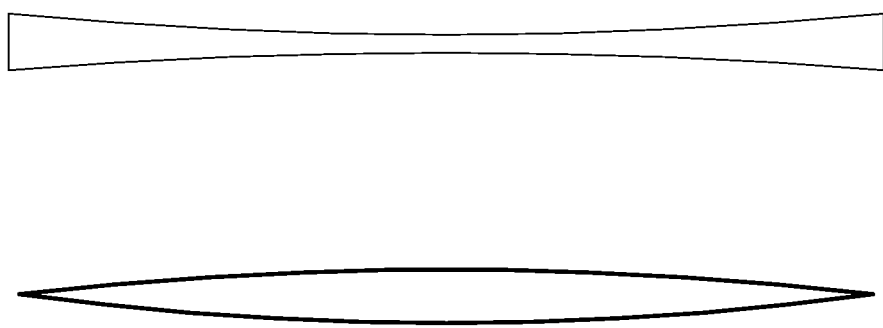
FIG. 11 is a cross-sectional view showing a configuration of an optical lens equivalent to a varifocal lens when signs of the refractive powers of two lens elements are opposite each other.
Figure 12:
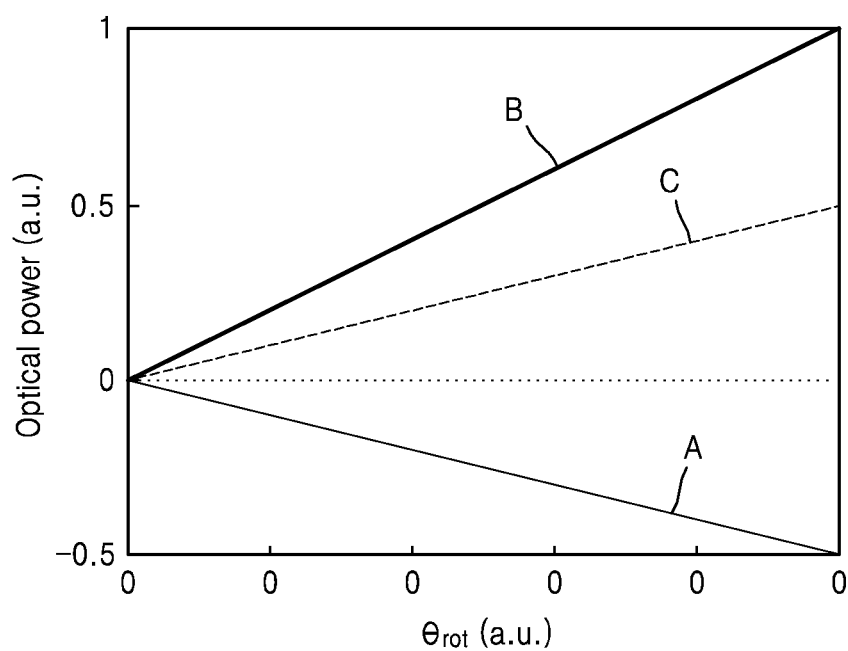
FIG. 12 is a graph showing a relationship between rotational displacements between a first phase plate and a second phase plate and between a third phase plate and a fourth phase plate and the refractive power of the varifocal lens, with respect to the example of FIG. 11.

FIG. 11 is a cross-sectional view showing a configuration of an optical lens equivalent to the varifocal lens 300 when the signs of the refractive powers of two lens elements, i.e., first and second elements, are opposite to each other, and FIG. 12 is a graph showing the relationship between the rotational displacements between the first phase plate 110 and the second phase plate 120 and between the third phase plate 130 and the fourth phase plate 140 and the refractive power of the varifocal lens 300, with respect to the example of FIG. 11. Referring to FIG. 11, the first lens element is designed to have a negative refractive power like a concave lens, and the second lens element is designed to have a positive refractive power likes a convex lens. The degree of change of the refractive power of the first lens element with respect to the relative rotational displacement between the first phase plate 110 and the second phase plate 120 may be equal to or different from the degree of change of the refractive power of the second lens element with respect to the relative rotational displacement between the third phase plate 130 and the fourth phase plate 140. To this end, the proportional constant a for the first lens element may have a positive value, and the proportional constant a for the second lens element may have a negative value.

Referring to FIG. 12, a line indicated by 'A' represents a change in the refractive power of the first lens element, a line indicated by 'B' represents a change in the refractive power of the second lens element, and a line indicated by 'C' represents the overall change in the refractive power of the varifocal lens 300. With such a configuration, the aberration of the varifocal lens 300 may be compensated for by appropriately adjusting the relative rotational displacement between the first phase plate 110 and the second phase plate 120 and the relative rotational displacement between the third phase plate 130 and the fourth phase plate 140.

Figure 13:
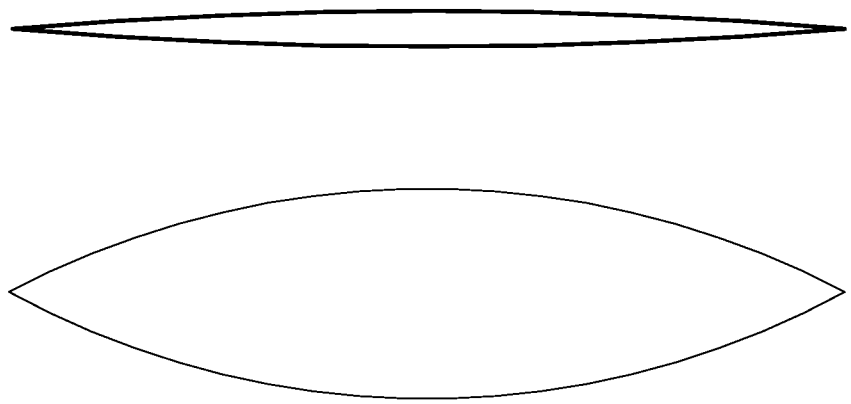
FIG. 13 is a cross-sectional view showing a configuration of an optical lens equivalent to a varifocal lens when the signs of the refractive powers of two lens elements are the same and the magnitudes of the refractive powers are different from each other.
Figure 14:
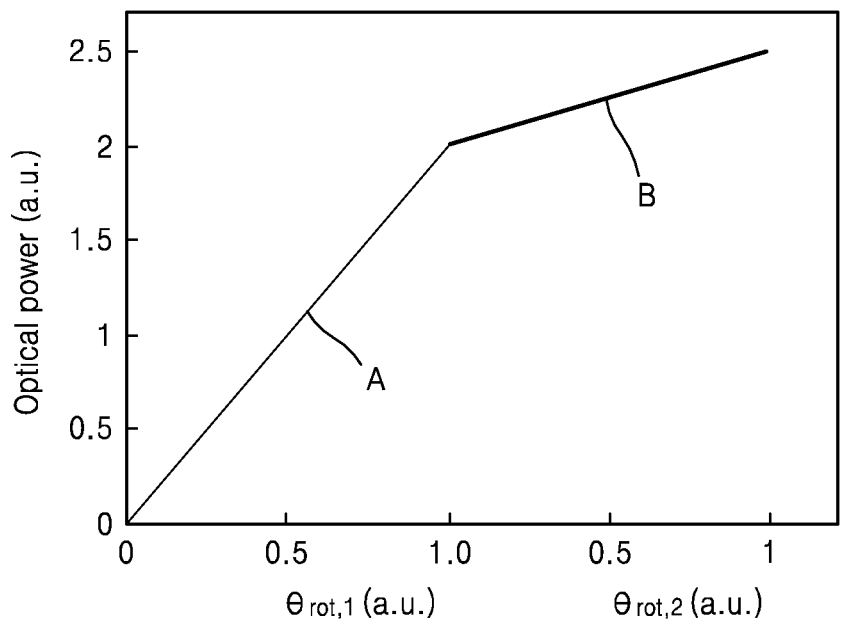
FIG. 14 is a graph showing a relationship between rotational displacements between a first phase plate and a second phase plate and between a third phase plate and a fourth phase plate and the refractive power of the varifocal lens, with respect to the example of FIG. 13.

FIG. 13 is a cross-sectional view showing a configuration of an optical lens equivalent to the varifocal lens 300 when the signs of the refractive powers of two lens elements, i.e., first and second lens elements, are the same and the magnitudes of the refractive powers are different from each other, and FIG. 14 is a graph showing the relationship between the rotational displacements between the first phase plate 110 and the second phase plate 120 and between the third phase plate 130 and the fourth phase plate 140 and the refractive power of the varifocal lens 300, with respect to the example of FIG. 13. Referring to FIG. 13, both the first lens element and the second lens element are designed to have a positive refractive power like a convex lens. The degree of change of the refractive power of the second lens element with respect to the relative rotational displacement between the third phase plate 130 and the fourth phase plate 140 may be greater than the degree of change of the refractive power of the first lens element with respect to the relative rotational displacement between the first phase plate 110 and the second phase plate 120. To this end, both the proportional constant a for the first lens element and the proportional constant a for the second lens element may have positive values, and the proportional constant a for the second lens element may be greater than that for the first lens element.

In this configuration, the refractive power of the varifocal lens 300 may be first adjusted in a large range by using the third phase plate 130 and the fourth phase plate 140, and then may be finely adjusted by using the first phase plate 110 and the second phase. Referring to FIG. 14, a line indicated by 'A' represents a refractive power contribution of the second lens element to the varifocal lens 300, and a line indicated by 'B' represents a refractive power contribution of the first element to the varifocal lens 300. For example, a change in the refractive power indicated by 'A' may be obtained by adjusting the relative rotational displacement between the third phase plate 130 and the fourth phase plate 140 in a state where the relative rotational displacement between the first phase plate 110 and the second phase plate 120 is fixed. Then, the refractive power indicated by 'B' may be finely adjusted by additionally adjusting the relative rotational displacement between the first phase plate 110 and the second phase plate 120 in a state where the relative rotational displacement between the third phase plate 130 and the fourth phase plate 140 is fixed.

Figure 15:
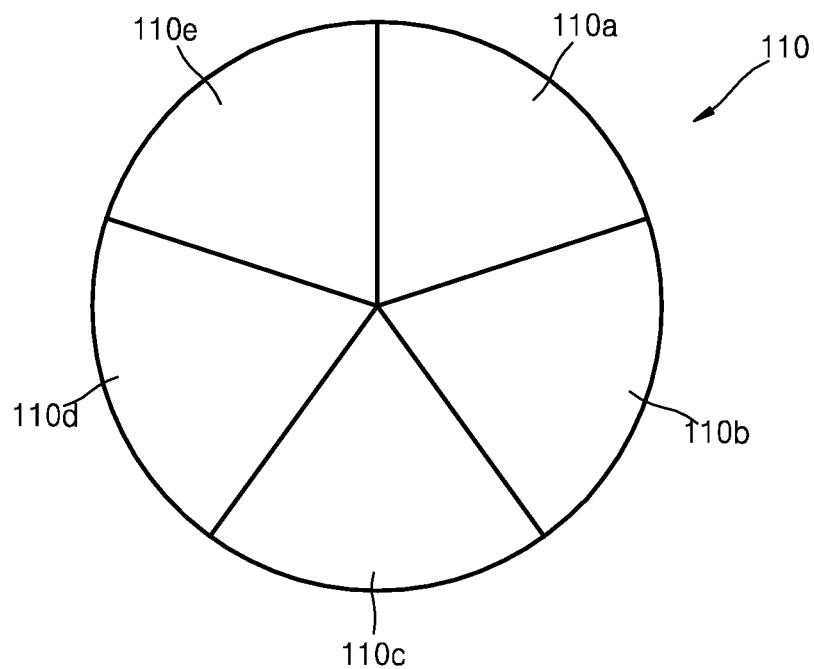
FIGS. 15 and 16 are plan views showing configurations of a first phase plate according to another exemplary embodiment.
Figure 16:
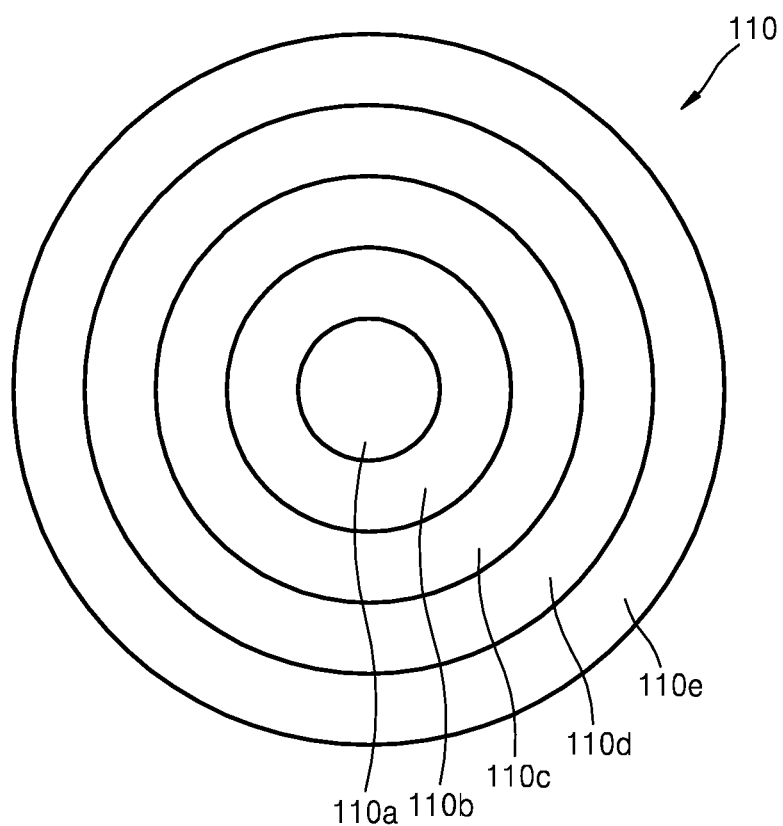

As may be understood from Equation 2, the refractive powers or focal lengths of the varifocal lenses 100, 200, and 300 are also affected by the wavelength λ of incident light. Accordingly, the first, second, third, and fourth phase plates 110, 120, 130, and 140 may be spatially divided so that the varifocal lenses 100, 200, and 300 may have various operating wavelengths. For example, FIGS. 15 and 16 are plan views showing configurations of a first phase plate 110 according to another exemplary embodiment. As shown in FIG. 15, the first phase plate 110 may be spatially divided into a plurality of regions (at least two regions), i.e., first, second, third, fourth, and fifth regions 110a, 110b, 110c, 110d, and 110e in an azimuth direction. In addition, as shown in FIG. 16, the first phase plate 110 may be spatially divided into a plurality of regions (at least two regions), i.e., first, second, third, fourth, and fifth regions 110a, 110b, 110c, 110d, and 110e in a radial direction. Alternatively, by combining the configuration of FIG. 15 and the configuration of FIG. 16, the first phase plate 110 may be spatially divided both in the azimuth direction and in the radial direction. Although the first phase plate 110 is shown in FIGS. 15 and 16 as being divided into five regions, i.e., first to, second, third, fourth, and fifth regions, 110a, 110b, 110c, 110d and 110e, by way of example, the inventive concept is not limited thereto and the number of division regions may be appropriately selected as needed. In addition, although only the first phase plate 110 is shown in FIGS. 15 and 16, the second, third, and fourth phase plates 120, 130, and 140 may also be spatially divided in the same manner as the first phase plate 110.

According to the present exemplary embodiment, the first, second, third, fourth, and fifth regions 110a, 110b, 110c, 110d, and 110e may have different operating wavelengths. In other words, the diameters of the first phase conversion elements 112 may be selected depending on a local position in the first region 110a so that the first region 110a has a first operating wavelength. The first phase conversion elements 112 may be arranged in each of the second, third, fourth, and fifth regions 110b, 110c, 110d, and 110e so that the second region 110b has a second operating wavelength, the third region 110c has a third operating wavelength, the fourth region 110d has a fourth operating wavelength, and the fifth region 110e has a fifth operating wavelength. For example, in order to allow the varifocal lens 100 to have the same refractive power or focal length with respect to the first to fifth operating wavelengths, the first phase conversion elements 112 may be arranged differently in the first, second, third, fourth, and fifth regions 110a, 110b, 110c, 110d, and 110e. To this end, the proportional constant a for each of the first, second, third, fourth, and fifth regions 110a, 110b, 110c, 110d, and 110e may be selected in inverse proportion to the operating wavelength thereof.

Figure 17:
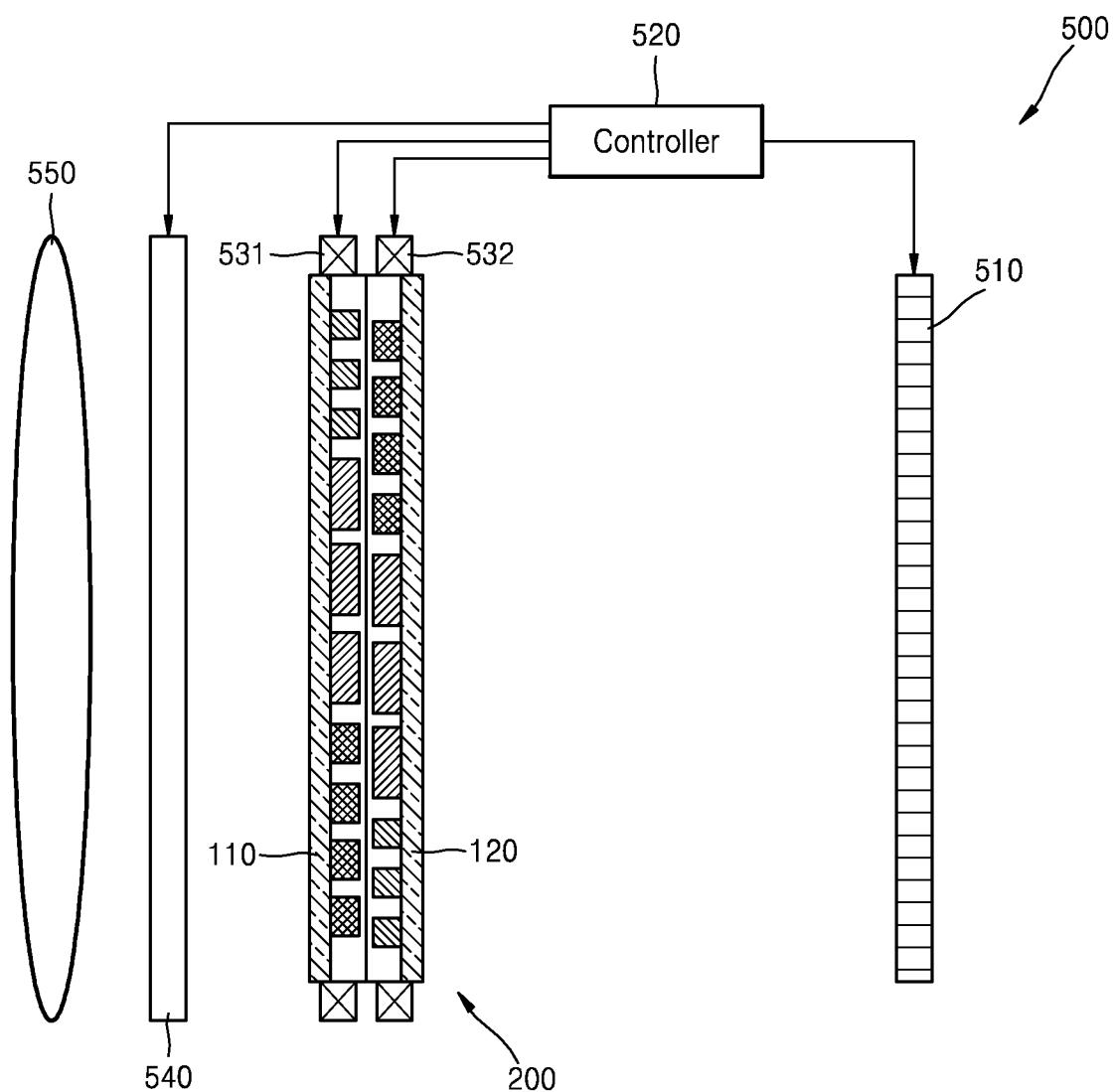
FIG. 17 is a conceptual diagram of an image acquisition apparatus according to an exemplary embodiment.

The varifocal lenses 100, 200, 300, and 400 described above may be used in an image acquisition device such as a compact camera or a camera for a mobile device. For example, FIG. 17 is a conceptual diagram of an image acquisition apparatus 500 according to an exemplary embodiment. Referring to FIG. 17, the image acquisition apparatus 500 may includes a varifocal lens 200, a first actuator 531 for rotating a first phase plate 110 of the varifocal lens 200, a second actuator 532 for rotating a second phase plate 120 of the varifocal lens 200, a controller 520 for controlling the rotational displacement between the first phase plate 110 and the second phase plate 120 by driving the first and second actuators 531 and 532, and an image pickup device 510 having a plurality of pixels for sensing light. Also, the image acquisition apparatus 500 may further include an optical shutter 540 for transmitting or blocking light as needed.

Although the varifocal lens 200 shown in FIG. 2 is illustrated in FIG. 17 by way of example, the image acquisition apparatus 500 may include other varifocal lenses 100 and 300. In addition, one of the first and second actuators 531 and 532 may be omitted in FIG. 17. In other words, both the first and second phase plates 110 and 120 may be rotated by using both the first and second actuators 531 and 532, or only one of the phase plates 110 and 120 may be rotated by using only one of the first and second actuators 531 and 532. The first and second actuators 531 and 532 may be electric devices using electrostatic force or magnetic force, or may be mechanical devices. The controller 520 may calculate rotational displacement to obtain a desired focal length of the varifocal lens 200 according to a pre-programmed program or a user's selection, and may control the first and second actuators 531 and 532 to rotate the first and second phase plates 110 and 120 by the calculated rotational displacement.

In addition, the image acquisition apparatus 500 may use only the varifocal lens 200, but may further include an additional optical lens element 550. Although only one optical lens element 550 is illustrated in FIG. 17 by way of example, the image acquisition apparatus 500 may use two or more optical lens elements 550 and the varifocal lens 200 together.

The image acquisition apparatus 500 may also perform a function of a depth sensor by taking a photograph while continuously adjusting the focal length of the varifocal lens 200. For example, since the distance of the subject varies depending on the focal length of the varifocal lens 200, a plurality of images obtained by performing photographing while continuously changing the focal length from a minimum focal length to a maximum focal length distance may be used to generate a depth map.

When the first and second phase plates 110 and 120 of the varifocal lens 200 are spatially divided as shown in FIG. 15 or 16, the optical shutter 540 may operate to use only any one of the first, second, third, fourth and fifth regions 110a, 110b, 110c, 110d, and 110e depending on the control of the controller 520. For example, the optical shutter 540 may transmit light toward only one of the first, second, third, fourth and fifth regions 110a, 110b, 110c, 110d, and 110e and block light toward the remaining regions.

While the rotational varifocal planar lens described above has been shown and described in connection with the exemplary embodiments illustrated in the drawings, it will be understood by those of ordinary skill in the art that various modifications and equivalent embodiments can be made therefrom. Therefore, the disclosed exemplary embodiments should be considered in an illustrative sense rather than a restrictive sense. The range of the embodiments will be in the appended claims, and all of the differences in the equivalent range thereof should be understood to be included in the embodiments.

What is claimed is:

1. An image acquisition device comprising:
   a varifocal lens comprising:
      a first phase plate comprising a plurality of first phase conversion elements, at least some of the plurality of first phase conversion elements having diameters that are different from each other; and
      a second phase plate comprising a plurality of second phase conversion elements, at least some of the plurality of second phase conversion elements having diameters that are different from each other,
   an actuator configured to rotationally displace the first phase plate and the second phase plate relative to each other;
   a controller configured to control the actuator to create a relative rotational displacement between the first phase plate and the second phase plate; and
   an image pickup device,
   wherein the diameters of the plurality of first phase conversion elements according to positions of the plurality of first phase conversion elements on the first phase plate and the diameters of the plurality of second phase conversion elements according to positions of the plurality of second phase conversion elements on the second phase plate are determined so that a phase of light transmitted through each of the first phase plate and the second phase plate is proportional to a square of a radial distance with respect to an optical axis and proportional to an azimuth angle.

2. The image acquisition device of claim 1, wherein the plurality of first phase conversion elements and the plurality of second phase conversion elements have radially symmetric column shapes,
   wherein the diameters of the plurality of first phase conversion elements are different from each other depending on the positions of the plurality of first phase conversion elements on the first phase plate so that the phase of light transmitted through the first phase plate changes differently depending on the positions of the plurality of first phase conversion elements on the first phase plate, and
   the diameters of the plurality of second phase conversion elements are different from each other depending on the positions of the plurality of second phase conversion elements on the second phase plate so that the phase of light transmitted through the second phase plate changes differently depending on the positions of the plurality of second phase conversion elements on the second phase plate.

3. The image acquisition device of claim 2, wherein each of the plurality of first phase conversion elements and each of the plurality of second phase conversion elements have a cylinder shape and have a thickness of 715 nm, and
   wherein the plurality of first phase conversion elements and the plurality of second phase conversion elements are arranged in the form of a hexagonal lattice with a period of 650 nm.

4. The image acquisition device of claim 1, wherein each of the first phase plate and the second phase plate is spatially divided into at least two regions in at least one of an azimuth direction and a radial direction, and
   the plurality of first phase conversion elements are arranged in the at least two regions of the first phase plate and the plurality of second phase conversion elements are arranged in the at least two regions of the second phase plate so that the at least two regions of each of the first phase plate and the second phase plate have operating wavelengths that are different from each other.

5. The image acquisition device of claim 1, wherein thicknesses of the plurality of first phase conversion elements are equal to thicknesses of the plurality of second phase conversion elements.

6. The image acquisition device of claim 1, wherein the first phase plate further comprises a first substrate that is transparent and the plurality of first phase conversion elements are arranged on the first substrate at regular intervals in a square lattice or hexagonal lattice shape, and the second phase plate further comprises a second substrate that is transparent and the plurality of second phase conversion elements are arranged on the second substrate at regular intervals in a square lattice or hexagonal lattice shape.

7. The image acquisition device of claim 6, wherein a space between the plurality of first phase conversion elements and a space between the plurality of second phase conversion elements are less than an operating wavelength.

8. The image acquisition device of claim 6, wherein each of the plurality of first phase conversion elements and each of the plurality of second phase conversion elements comprise a material having a refractive index higher than that of the first substrate and the second substrate.

9. The image acquisition device of claim 8, wherein each of the plurality of first phase conversion elements and each of the plurality of second phase conversion elements comprise at least one material selected from germanium (Ge), amorphous silicon (a-Si), polycrystalline silicon (p-Si), monocrystalline silicon (c-Si), group III-V compound, $TiO_2$, and SiNx.

10. The image acquisition device of claim 8, wherein the refractive index of each of the plurality of first phase conversion elements and the refractive index of each of the plurality of second phase conversion elements are greater than 3.5 at a visible light wavelength.

11. The image acquisition device of claim 6, wherein each of the first substrate and the second substrate have a flat plate shape, and the first phase plate and the second phase plate are arranged so that the plurality of first phase conversion elements and the plurality of second phase conversion elements face each other.

12. The image acquisition device of claim 6, wherein the first phase plate further comprises a first dielectric layer provided on the first substrate and filling spaces between the plurality of first phase conversion elements, the second phase plate further comprises a second dielectric layer provided on the second substrate and filling spaces between the plurality of second phase conversion elements, and each of the first dielectric layer and the second dielectric layer are transparent.

13. The image acquisition device of claim 12, wherein a thickness of the first dielectric layer is greater than thicknesses of the plurality of first phase conversion elements so that the first dielectric layer completely covers the plurality of first phase conversion elements, and a thickness of the second dielectric layer is greater than thicknesses of the plurality of second phase conversion elements so that the second dielectric layer completely covers the plurality of second phase conversion elements.

14. The image acquisition device of claim 13, wherein the first phase plate and the second phase plate are arranged so that the first dielectric layer and the second dielectric layer are in contact with each other.

15. The image acquisition device of claim 1, wherein the first phase plate and the second phase plate face each other along the optical axis and are rotatable relative to each other about the optical axis to create relative rotational displacement between the first phase plate and the second phase plate, and the plurality of first phase conversion elements and the plurality of second phase conversion elements are configured so that light transmitted through the first phase plate and the second phase plate is focused on different positions on the optical axis depending on the relative rotational displacement between the first phase plate and the second phase plate.

16. The image acquisition device of claim 15, wherein when the relative rotational displacement between the first phase plate and the second phase plate is 0, a refractive power of the varifocal lens is greater than 0, and the plurality of first phase conversion elements and the plurality of second phase conversion elements are arranged so that the refractive power of the varifocal lens is proportional to the relative rotational displacement between the first phase plate and the second phase plate.

17. The image acquisition device of claim 1, further comprising:

a third phase plate comprising a plurality of third phase conversion elements, at least some of the plurality of third phase conversion elements having diameters that are different from each other; and a fourth phase plate including a plurality of fourth phase conversion elements, at least some of the plurality of fourth phase conversion elements having diameters that are different from each other, wherein the plurality of first phase conversion elements and the plurality of second phase conversion elements are configured so that the first phase plate and the second phase plate collectively function as a first lens element, and the plurality of third phase conversion elements and the plurality of fourth phase conversion elements are configured so that the third phase plate and the fourth phase plate collectively function as a second lens element.

18. The image acquisition device of claim 17, wherein the diameters of the plurality of third phase conversion elements according to positions of the plurality of third phase conversion elements on the third phase plate and the diameters of the plurality of fourth phase conversion elements according to positions of the plurality of fourth phase conversion elements on the fourth phase plate are determined so that a phase of light transmitted through each of the third phase plate and the fourth phase plate is proportional to a square of a radial distance with respect to the optical axis and proportional to an azimuth angle.

19. The image acquisition device of claim 18, wherein each of the plurality of third phase conversion elements and each of the plurality of fourth phase conversion elements have a radially symmetric column shape, the diameters of the plurality of third phase conversion elements are different from one another depending on the positions of the plurality of third phase conversion elements on the third phase plate so that the phase of light transmitted through the third phase plate changes differently depending on the positions of the plurality of third phase conversion elements on the third phase plate, and the diameters of the plurality of fourth phase conversion elements are different from one another depending on the positions of the plurality of fourth phase conversion elements on the fourth phase plate so that the phase of light transmitted through the fourth phase plate changes differently depending on the positions of the plurality of fourth phase conversion elements on the fourth phase plate.

20. The image acquisition device of claim 17, wherein the first phase plate, the second phase plate, the third phase plate, and the fourth phase plate are sequentially arranged along the optical axis, the third phase plate and the fourth phase plate are rotatable relative to each other about the optical axis to create relative rotational displacement between the third phase plate and the fourth phase plate, and the plurality of third phase conversion elements and the plurality of fourth phase conversion elements are configured so that light transmitted through the third phase plate and the fourth phase plate is focused on different positions on the optical axis depending on the relative rotational displacement between the third phase plate and the fourth phase plate.

* * * * *